Dec. 17, 1929.  C. S. PADGETT  1,739,856
STEERING MEANS
Filed March 21, 1927   3 Sheets-Sheet 1

INVENTOR
Claude S. Padgett
BY
J. F. Brandenburg
attorney

Dec. 17, 1929.    C. S. PADGETT    1,739,856
STEERING MEANS
Filed March 21, 1927    3 Sheets-Sheet 2
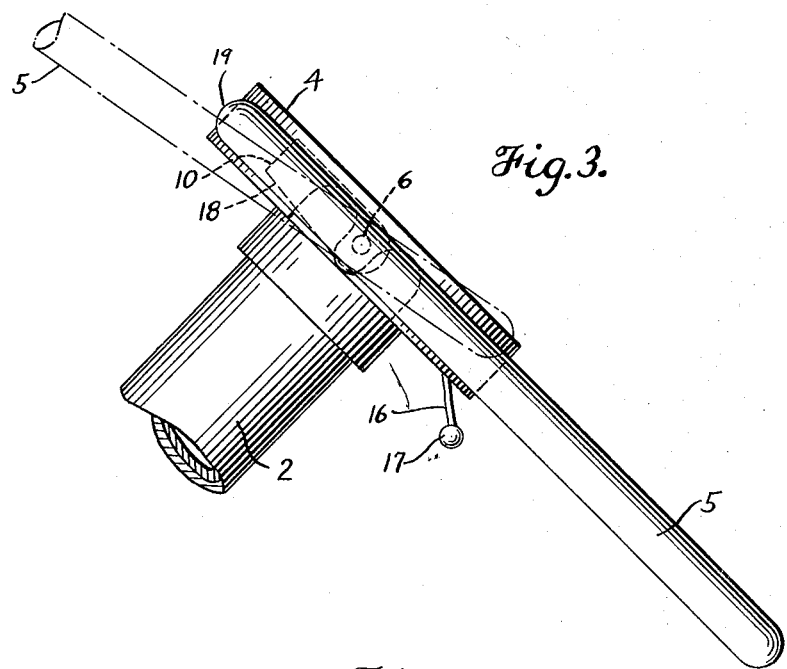
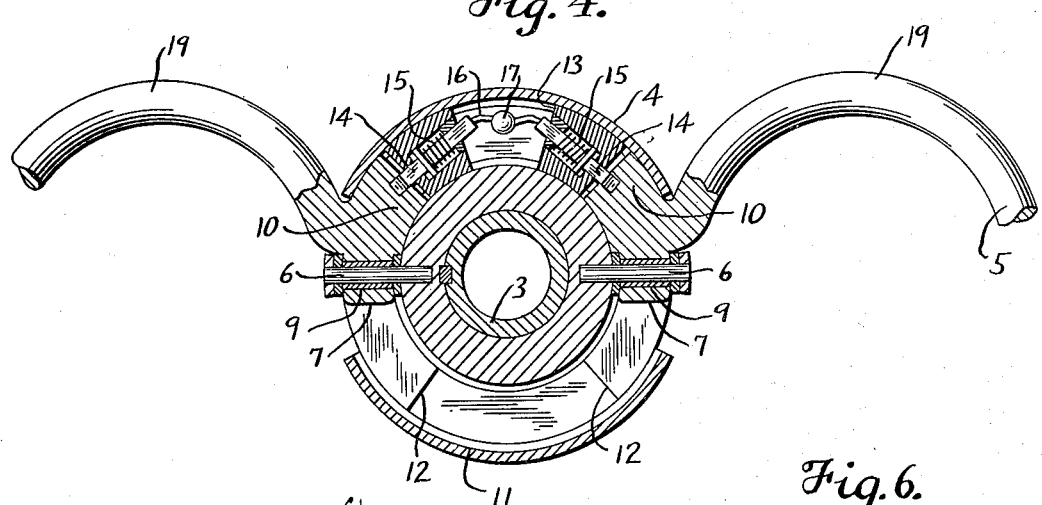
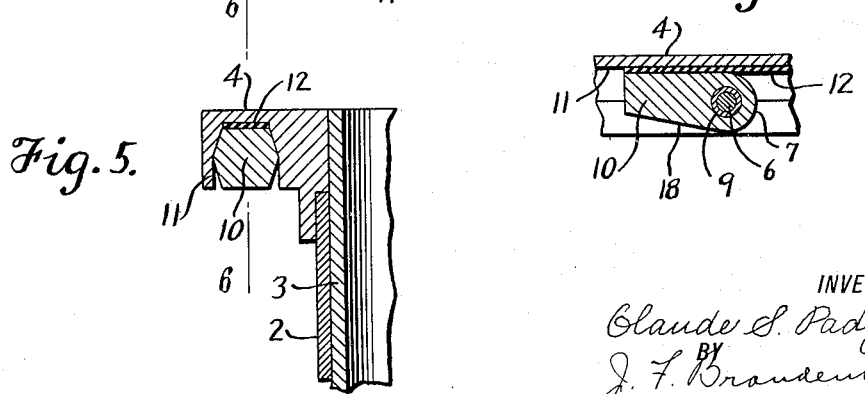
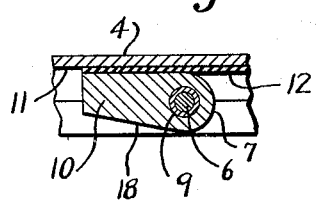

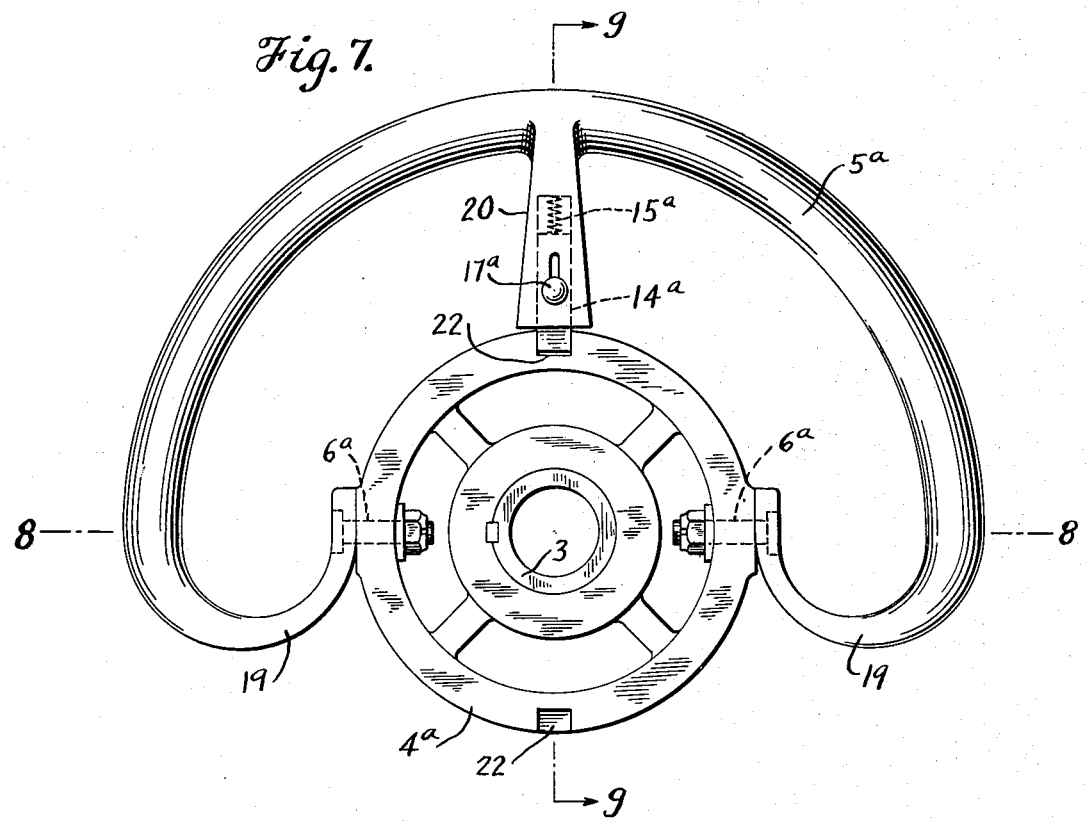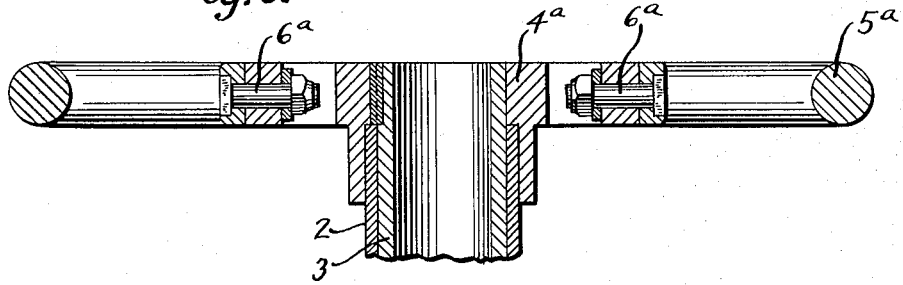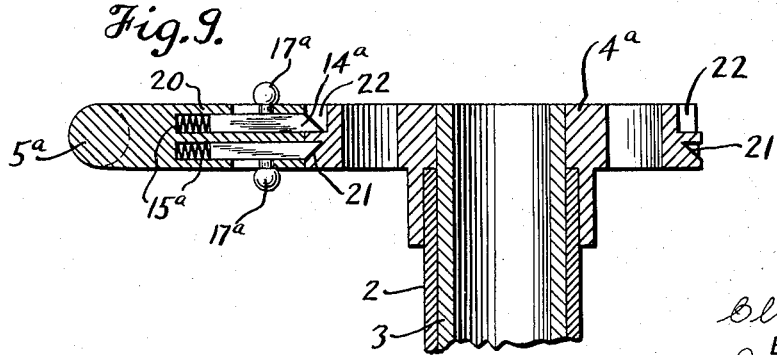

Patented Dec. 17, 1929

1,739,856

UNITED STATES PATENT OFFICE

CLAUDE S. PADGETT, OF WASHINGTON, DISTRICT OF COLUMBIA, ASSIGNOR TO IRENE BRANDENBURG, OF WASHINGTON, DISTRICT OF COLUMBIA

STEERING MEANS

Application filed March 21, 1927. Serial No. 177,074.

The object of the invention is to provide a steering device for automobiles or other automotive conveyances having greatly increased utility and convenience over both ordinary steering wheels and the various styles of tilting steering wheels that have been devised, as well as being much cheaper to manufacture than the designs of tilting wheels now in use.

The ordinary steering wheel fixedly mounted on the upper end of the inclined steering post is brought so close to the driver's seat that it is awkward for him to slide under the wheel. It was to overcome this difficulty that the tilting steering wheels, which could be shifted out of the way, came into use, but their adoption has been limited. The present device secures all the advantages of a tilting steering wheel, with others of an important nature novel in any steering wheel with which I am familiar.

One of the drawbacks of any steering wheel for many drivers, especially short persons, is the obstruction of view by the upwardly sloping forward part of the wheel. Another is the weariness of occupying one confined position during long drives. For stout persons, the close approach of the lower arc of the wheel to the driver's place is a matter of actual discomfort. Carrying of bundles on the lap is, of course, excluded. For any driver, freedom is greatly circumscribed, which is not only irksome but in extended or trying driving is conducive to accident.

This invention, briefly stated, is a reversible steering segment or sector. It is less than a full wheel, and by important preference, somewhat more than a semicircle, that is to say, its terminal grips are past the diameter, and it is easily reversible by simply swinging up and over from a near position, corresponding to a lower segment of an ordinary steering wheel, to a far position, corresponding to an upper segment of such a wheel, and vice-versa. Suitable means are provided for sustaining the segment in either of these operative positions for driving, the segment being preferably locked by a readily releasable latch in one or both of the positions.

The far position of the segment is not an inoperative position; it is a driving position, which also permits the driver to get quickly in and out. The ease of being able to change one's position during driving, without even stopping the car, by swinging the segment away to the upper region, so that the driver may rest forward on the "wheel," is not to be underestimated. For stout persons it will be the usual driving condition. Short drivers, on the other hand, will find great relief in the elimination of the view-obstructing upper part of the wheel when the segment is in the near position, but any driver has the opportunity of change from one position to another.

The terminal grips of the segment give a very natural and effective leverage for steering, making the segment an even more effective steering implement than the full wheel with its spokes. As previously indicated it is important that these terminal grips be carried past the diameter through the center, i. e. the steering axis. Because of the advantageous leverage, the radii of the segment may be shorter at the ends than at the middle, giving more clearance for the driver in entering or leaving his seat when the wheels are sharply cramped against the curb. The segment also furnishes in itself an indicator of the position of the front wheels of the car.

In the accompanying drawings forming a part hereof:

Fig. 3 is a side elevation showing the steering sector in full lines in the "near" position, and the "far" position being indicated by broken lines;

Fig. 4 is a section looking up, taken on the line 4—4 of Fig. 1, most of the sector being broken away;

Fig. 5 is a detail section taken on the line 5—5 of Fig. 2;

Fig. 6 is a section on the line 6—6 of Fig. 5;

Fig. 7 is a plan view of another embodiment;

Fig. 8 is a section on the line 8—8 of Fig. 7; and

Fig. 9 is a section on the line 9—9 of Fig. 7.

Figure 1:
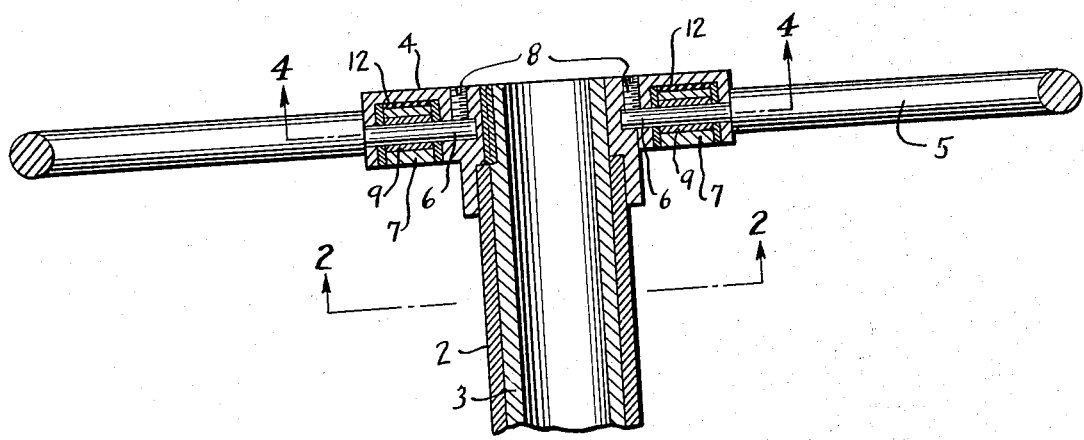
Fig. 1 is a section in the plane of the axis of the steering column, illustrating one form of embodiment of the invention.
Figure 2:
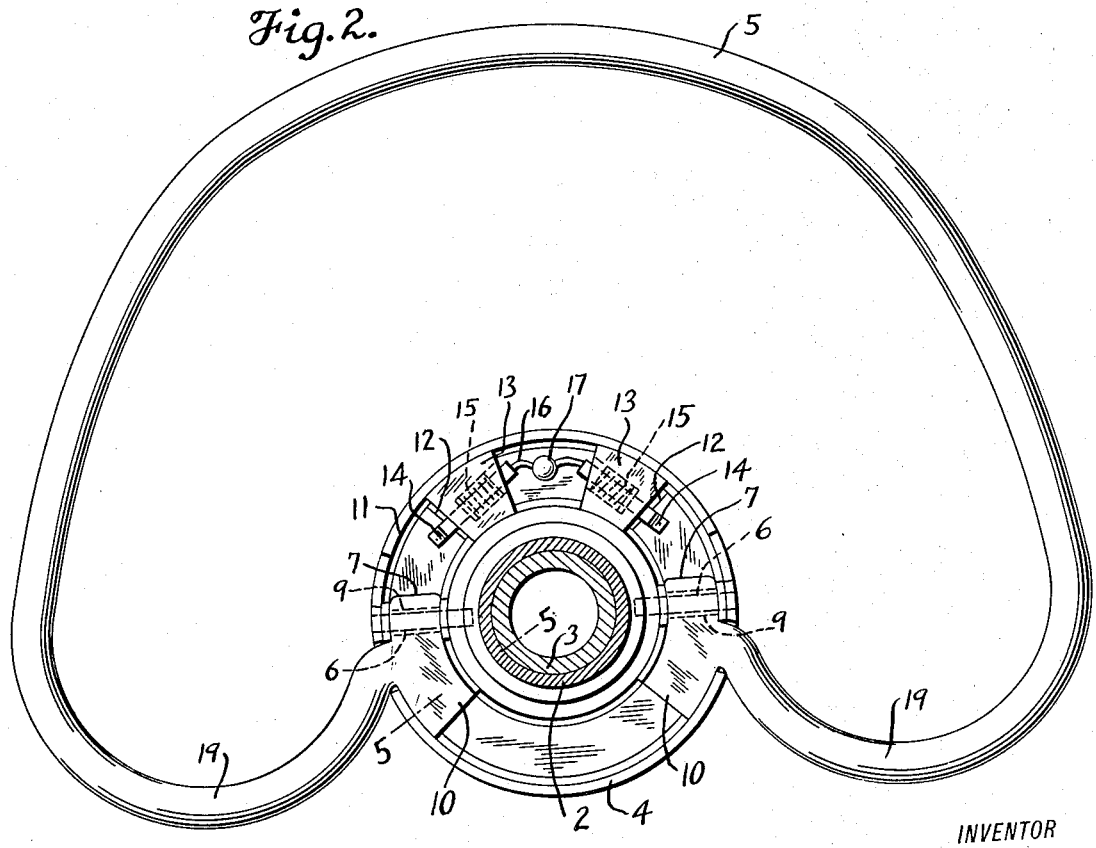
Fig. 2 is a sectional bottom plan taken on the line 2—2 of Fig. 1.

In Figs. 1–6, the steering column is marked 2, and the steering post 3. On the upper end of the steering post there is fixed a hub or head 4, and on this, pivoted or otherwise swingly mounted, is the steering segment 5, corresponding to a little more than half of a steering wheel, except that, as illustrated in these views it need not, and preferably does not, have any interior spokes to lie in the line of vision through the windshield. It is very desirable for the interior of the segment to be entirely open in this manner, though the invention is not necessarily limited to the feature. Also, the segment need not be, and preferably is not, the segment of a true circle, the radii at the ends being shorter than the radii at the middle, as shown, the curve being suitably and gradually varied. Curved terminal grips carried past the diameter are marked 19.

The ends 7 of the segment, that is to say the rim, are rebent or recurved, and alined pivot pins 6 are passed through these ends into the hub in the line of the transverse diameter through the axis of the steering post. The pins are preferably bushed by anti-rattling bushings 9, and may advantageously be plain pins inserted from the outside and retained by screws 8 set in from the top or bottom of the hub.

Integral with or fixed to the ends of the rim, in this construction, are sustaining lugs 10, which in either position bear upward against the under side of the hub and solidly support and brace the segment against dropping down below the desired driving positions. The hub is formed underneath with a groove 11, advantageously tapered toward the top, the lugs 10 being correspondinly tapered above and below, to receive the lugs, affording lateral support so as to take all wrenching strain off the pivots. A gasket or soft facing 12 in the top of the groove, underneath the hub, also prevents rattle.

Locking or latching means may, and preferably are, also provided. Such means may be widely varied. As shown, blocks 13 are fixed in the groove in positions to hold latch bolts 14 pressed by springs 15 to enter sockets in the lugs 10. Wires or chains 16 connected to these bolts and to a common button 17 afford convenient means for retracting the bolts. The bolts are shown in position for locking the segment in the far position against swinging upward while driving, but it will be understood that they may also be provided at the other side to lock the segment in the near position.

In Figs. 7 to 9, the hub 4ª is shown of somewhat different form. The segment 5ª, for purpose of illustration, is shown as the segment of a circle. The pivots 6ª may be of any suitable description. In this case, the segment has a central spoke 20 which carries twin latches 14ª pressed by springs 15ª and having pins or knobs 17ª for retracting them. The hub is provided at opposite sides with keeper notches 21 and 22, or other suitable recesses, surfaces or shoulders to cooperate with the latches, so that in either position the segment is held against movement either up or down.

Certain desiderata have been indicated, but it will be understood that the invention is not limited to details, and that there may be wide variation in physical embodiment, and that the invention is applicable to automotive conveyances other than road vehicles.

I claim:

1. The combination with the steering post of an automobile, of a hub on said post, and a wheel part consisting of a single reversible steering segment swingingly connected to said hub in a manner to swing up and over from a near driving position to a far driving position and vice-versa.

2. A steering device of the kind described comprising a turnable support and a wheel part consisting of a single reversible steering segment swingingly connected thereto in a manner to swing up and over from a near driving position to a far driving position and vice-versa.

3. A steering device of the kind described comprising a hub on the steering post, a single steering segment swingingly connected to said hub so as to be reversible, and means for sustaining said segment in near and far driving positions.

4. A steering device of the kind described comprising a hub on the steering post, a wheel part consisting of a single reversible steering segment swingingly connected to said hub, and means for locking said segment in one or both of its driving positions.

CLAUDE S. PADGETT.